…

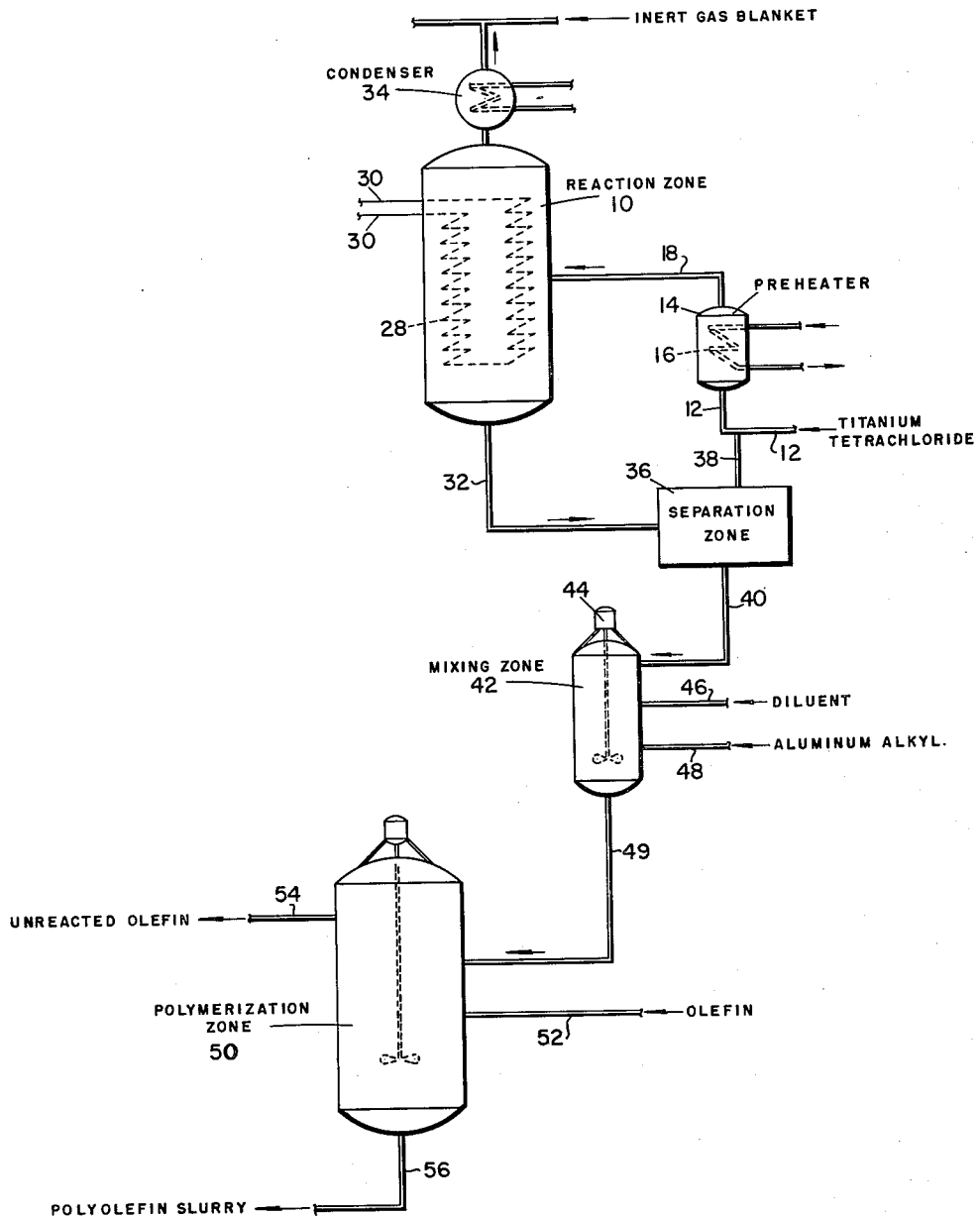

United States Patent Office 2,993,009
Patented July 18, 1961

2,993,009
PROCESS FOR REDUCING TITANIUM TETRACHLORIDE
Delos E. Bown and Herschel C. Williams, Baytown, Tex., assignors, by mesne assignments, to Esso Research and Engineering Company, Elizabeth, N.J., a corporation of Delaware
Filed Mar. 4, 1957, Ser. No. 643,676
7 Claims. (Cl. 252—429)

This invention relates to a process for reducing titanium tetrachloride. More particularly, this invention relates to a process for reducing titanium tetrachloride to a product consisting primarily of titanium trichloride which may be used in the preparation of an olefin polymerization catalyst for alpha olefin polymerization as disclosed and claimed in copending Bown, Watson and Schutze application Serial No. 643,503, filed March 4, 1957 and entitled, "Olefin Polymerization."

In accordance with the present invention, a product useful for the preparation of an olefin polymerization catalyst is prepared by heating volatilized titanium tetrachloride to a temperature within the range of about 800° to about 1200° C.

Preferably, in accordance with a preferred form of the present invention, the liquid titanium chloride is heated to reflux temperature and the refluxing titanium tetrachloride (comprising vaporized titanium tetrachloride and entrained liquid titanium tetrachloride) is contacted with a heating element maintained at a temperature within the range of about 800° to 1200° C.

The reduction process of the present invention will be further described with respect to the accompanying drawing wherein the single figure is a diagrammatic flow sheet illustrating a preferred manner in which the process of the present invention may be practiced.

In accordance with this showing, there is provided a reactor 10 of any suitable construction. Titanium tetrachloride from a source (not shown) is passed by way of a line 12 through a preheater 14 provided with a heating coil 16 wherein vaporized titanium tetrachloride is evolved. The vaporized titanium tetrachloride is passed from the preheater 14 by way of the line 18 to the reaction zone 10.

The reaction zone 10 should be of a construction such that a temperature of at least about 800° C. may be provided by external or internal heating means. Thus, for this purpose the reaction zone 10 may be equipped with electroconductive heating element 28 formed from any suitable material such as tungsten, platinum, Ni-chromium, etc. The element 28 may be present in the form of a filament, screen, plate, etc., and is connected with a suitable source of electrical energy (not shown) by means of conductors 30—30. It will be understood that, if desired, the reaction zone may be externally heated by suitable means (not shown).

As a consequence, at least a portion of the vaporized titanium tetrachloride charged to the reaction zone 10 by way of the line 18 is brought to a temeprature within the range of about 800° to 1200° C. whereby a solid purple crystalline product consisting primarily of titanium trichloride is formed. In addition, condensation of a portion of the vaporized titanium tetrachloride will normally occur.

As a consequence, a slurry of crystalline purple product in condensed titanium tetrachloride will collect at the bottom of reaction zone 10. The slurry may be withdrawn from reaction zone 10 by way of a bottoms discharge line 32 leading to a suitable recovery zone 36 for separating the dark purple crystalline product from liquid titanium tetrachloride. Unreacted vaporized titanium tetrachloride is condensed at the top of the reaction zone 10 by means of condenser 34 and is returned to the reactor 10.

It is preferable that the surfaces of the element 28 and the reaction zone 10 be washed continuously with liquid titanium tetrachloride. For this reason, it is preferable that the liquid titanium tetrachloride charged to the preheater 14 by way of the line 12 be brought to a vigorous boil within the preheater 14 whereby the titanium tetrachloride vaporized in the preheater 14 will carry entrained liquid titanium tetrachloride into the reaction zone 10.

The reaction in the zone 10 should be conducted in the absence of active polar compounds such as oxygen, water, etc. The slurry of titanium trichloride product in liquid titanium tetrachloride, as indicated, is separted in the separation zone 36 by any suitable means such as filtration, centrifugation, etc. in the absence of deleterious polar active compounds and preferably under an inert atmosphere (e.g., nitrogen, helium, etc.). The titanium tetrachloride recovered in the separation zone 36 may, if desired, be recycled by way of a line 38 to the titanium tetrachloride charge line 12 leading to the preheater 14.

The dark purple crystal product is discharged from the separation zone 36 by way of a line 40 blanketed with an inert atmosphere which preferably leads to a mixing zone 42 provided with suitable agitating means 44 where the product is mixed with an organic diluent (e.g., a $C_6$ to $C_{12}$ paraffinic hydrocarbon such as n-hexane, n-heptane, etc., and aromatic hydrocarbons such as benzene, a halogenated hydrocarbon such as chlorobenzene, dichlorobenzene, fluorobenzene, etc., or a mixture of two or more suitable diluent compounds), the diluent being charged to the mixing zone 42 by way of a line 46. A suitable co-catalyst compound is also added by way of line 48. Suitable co-catalyst compounds which may be used include organometallic compounds having reducing properties, including aluminum dialkyls and aluminum trialkyls such as diethyl aluminum chloride and triethyl aluminum.

There is thus formed within the mixing zone 42 an olefin polymerization catalyst composition which is discharged therefrom by way of a line 49 leading to an olefin polymerization zone 50. A suitable olefin to be polymerized such as ethylene, propylene, isobutylene, etc., is charged to the polymerization zone 50 by way of a line 52 whereby such olefin is polymerized by contact with the olefin polymerization composition.

Unreacted olefin is withdrawn from the polymerization zone 50 by way of a line 54 and a slurry comprising polymerized olefin and organic diluent is discharged from polymerization zone 50 by way of a line 56 leading to a suitable polyolefin recovery zone (not shown).

As in the case of the reaction zone 10, the polymerization zone 50 should be substantially completely free from active polar compounds such as water, oxygen, hydrogen, etc.

The present invention will be further illustrated by the following specific examples which are given by way of illustration and are not intended as a limitation on the scope of this invention.

*Example 1*

A glass-lined reaction vessel is provided with a platinum filament which is heated to a temperature of about 1000° C. In a separate reboiler vessel connected to the bottom of the reaction vessel, titanium tetrachloride is brought to a boil and vaporized titanium tetrachloride, together with the entrained liquid titanium tetrachloride, is charged to the reaction vessel through the connection between the two vessels. Within the reaction vessel, a portion of the titanium tetrachloride is reduced to form a dark purple product consisting primarily of titanium trichloride, which product is formed as a purple gas which condenses in the liquid titanium chloride as a solid crystalline product. The crystalline product, together with liquid titanium tetrachloride, collects in the bottom of the reboiler vessel. The titanium tetrachloride in the reboiler vessel is refluxed at a rate such that the reaction vessel and the filament are thoroughly washed free of evolved product.

The dark purple product prepared in this fashion, on exposure to air and water at atmospheric pressure, decomposes and may spontaneously ignite. Accordingly, the separated solid purple crystalline product should be stored in an inert atmosphere.

An olefin polymerization catalyst composition consisting of n-heptane containing about 1 weight percent of a mixture of about 2 mols of triethyl aluminum per mol of dark purple product (calculated as titanium trichloride) is prepared by mixing the above-obtained dark purple product with the requisite amount of triethyl aluminum and n-heptane. The composition may be used for the polymerization of propylene at atmospheric temperature and pressure whereby high molecular weight normally solid polypropylene may be prepared.

*Example II*

A cylindrical glass reactor, provided with a heating jacket, is heated to a temperature of about 800° C. In a separate reboiler vessel connected to the bottom of the reaction vessel, titanium tetrachloride is brought to a boil and vaporized titanium tetrachloride, together with entrained liquid titanium tetrachloride, is charged to the reaction vessel through the connection between the two vessels. Within the reaction vessel, a portion of the titanium tetrachloride is reduced to yield the same product as in Example I.

What is claimed is:

1. A method for preparing a reduction product consisting essentially of titanium trichloride which comprises heating vaporized titanium tetrachloride in a reaction zone to a temperature of about 800° to about 1200° C. to thermally reduce a portion of said titanium tetrachloride to purple titanium trichloride.

2. A method of preparing an olefin polymerization catalyst which comprises the steps of heating vaporized titanium tetrachloride in a reaction zone at a temperature within the range of about 800° to 1200° C. to thermally reduce a portion of said heated titanium tetrachloride to titanium trichloride to thereby form a dark purple solid product consisting essentially of titanium trichloride, recovering said product and mixing said recovered product with an aluminum alkyl and an organic diluent selected from the class consisting of paraffinic hydrocarbons, aromatic hydrocarbons, and chlorinated aromatic hydrocarbons.

3. A method as in claim 2 wherein the reaction zone is externally heated.

4. A method as in claim 2 wherein the diluent is n-heptane and the aluminum alkyl compound is triethyl aluminum.

5. A method which comprises charging vaporized titanium tetrachloride to a reaction zone provided with an electroconductive heating element maintained at a temperature within the range from about 800° to 1200° C. through the passage of an electric current therethrough whereby at least a portion of said vaporized titanium tetrachloride is condensed and whereby at least another portion of said titanium tetrachloride is thermally reduced to a dark purple product consisting essentially of titanium trichloride, whereby a slurry of said purple product in said condensed titanium tetrachloride is formed, withdrawing said slurry from said reaction zone and recovering said purple product from said titanium tetrachloride.

6. A method which comprises charging vaporized titanium tetrachloride to a reaction zone provided with an electroconductive heating element maintained at a temperature of about 1000° C. through the passage of an electric current therethrough whereby at least a portion of said vaporized titanium tetrachloride is condensed and whereby at least another portion of said titanium tetrachloride is thermally reduced to a dark purple product consisting essentially of titanium trichloride, whereby a slurry of said purple product in said condensed titanium tetrachloride is formed, withdrawing said slurry from said reaction zone and recovering said purple product from said titanium tetrachloride, said heating element being a platinum heating element.

7. A method for preparing an olefin polymerization catalyst which comprises the steps of charging vaporized titanium tetrachloride to a reaction zone provided with an electroconductive heating element maintained at a temperature within the range from about 800° to 1200° C. through the passage of an electric current therethrough whereby at least a portion of said vaporized titanium tetrachloride is condensed and whereby at least another portion of said titanium tetrachloride is thermally reduced to a dark purple product consisting essentially of titanium trichloride, whereby a slurry of said purple product in said condensed titanium tetrachloride is formed, separating said purple product from the titanium tetrachloride in said slurry, and mixing said recovered product with an aluminum alkyl and an organic diluent selected from the class consisting of paraffinic hydrocarbons, aromatic hydrocarbons, and chlorinated aromatic hydrocarbons.

References Cited in the file of this patent

UNITED STATES PATENTS

| | | |
|---|---|---|
| 2,387,517 | Kraus | Oct. 23, 1945 |
| 2,551,341 | Scheer | May 1, 1951 |
| 2,717,915 | Shapiro | Sept. 13, 1955 |
| 2,721,189 | Anderson | Oct. 18, 1955 |
| 2,739,566 | Shapiro | Mar. 27, 1956 |

FOREIGN PATENTS

| | | |
|---|---|---|
| 526,101 | Italy | May 14, 1955 |

OTHER REFERENCES

Sherfey: Apparatus for Preparation of Anhydrous $TiCl_3$ and $TiBr_3$, Jour. of Research of the National Bureau of Standards, vol. 46, No. 4, April 1951.

Chem. Abs.—49, 5789 h,i. 1955.

Jour. of Applied Chemistry, vol. 7, No. 2, Feb. 57, p. i–92, "Method of Preparing Titanium Trichloride."